United States Patent [19]

Greter et al.

[11] Patent Number: 5,205,042

[45] Date of Patent: Apr. 27, 1993

[54] PROCESS FOR ADJUSTING THE VERTICALITY OF AN ARTICLE DISPOSED IN A CLOSED ENVELOPE AND ASSEMBLY FOR CARRYING THIS PROCESS

[75] Inventors: Lucien Greter, Le Plessis Trevise; Francois Venet, Paris, both of France

[73] Assignee: L'Air Liquide, Societe Anonyme Pour L'Etude Et L'Exploitaion Des Procedes Georges Claude, Paris, France

[21] Appl. No.: 774,220

[22] Filed: Oct. 9, 1991

[30] Foreign Application Priority Data

Oct. 18, 1990 [FR] France .................. 90 12890

[51] Int. Cl.$^5$ .............................................. G01C 9/00
[52] U.S. Cl. ..................................... 33/365; 33/366; 33/291; 33/392; 62/125
[58] Field of Search ............... 33/391, 366, 291, 370, 33/392, 365; 62/36, 45.1, 125, 297, 298; 203/1, DIG. 22

[56] References Cited

U.S. PATENT DOCUMENTS

| | | | |
|---|---|---|---|
| 1,952,745 | 3/1934 | Deasy | 33/396 |
| 2,916,916 | 12/1959 | Holsclaw . | |
| 3,372,386 | 3/1968 | Klinger | 33/370 |
| 3,521,369 | 7/1970 | Jones . | |
| 3,975,831 | 8/1976 | Jysky et al. | 33/333 |
| 4,265,027 | 5/1981 | Burniski | 33/291 |
| 4,459,813 | 7/1984 | Petta | 62/297 |
| 4,860,553 | 8/1989 | Evans | 62/297 |
| 4,949,467 | 9/1990 | Oman et al. . | |
| 5,072,615 | 12/1991 | Nawrocki | 33/366 |

FOREIGN PATENT DOCUMENTS 2221713 10/1974 France .
2510900 2/1983 France .
661350 7/1987 Switzerland .

Primary Examiner—William A. Cuchlinski, Jr.
Assistant Examiner—Alvin Wirthlin
Attorney, Agent, or Firm—Young & Thompson

[57] ABSTRACT

The article of which the verticality is critical, for example a distillation column disposed in a closed envelope, is associated with an indicator of verticality comprising a suspended mass and a locating ring. The envelope, which contains the various inner articles, is placed on a base by means of supports and its inclination with respect to the base is adjusted by controlling the relative position of the mass with respect to the ring. Application for example to cold boxes for the in situ production of gas from air.

10 Claims, 2 Drawing Sheets

PROCESS FOR ADJUSTING THE VERTICALITY OF AN ARTICLE DISPOSED IN A CLOSED ENVELOPE AND ASSEMBLY FOR CARRYING THIS PROCESS

BACKGROUND OF THE INVENTION (a) Field of the Invention

The present invention concerns a process for adjusting the verticality of an article placed in a closed envelope which is mounted on a base and the corresponding assemblies.

(b) Description of Prior Art

There are a certain number of systems or assemblies incorporating an article, generally active, whose verticality is critical. In certain fields, such as for the preparation of gases and in precision measuring aparatuses, the article in question, as well as others, is contained in a closed envelope, more often hermetically sealed. Up til now, the adjustment of the verticality in situ of the article in its envelope is obtained by precisely fixing, and within extremely narrow margins, the article to the envelope, and by effecting a precision mounting of the latter on a rigid bottom, perfectly flattened and made horizontal. These arrangements considerably increase the cost of these assemblies. On the other hand, in case of assembly where the envelope containing the articles, is filled with a heat insulating material and/or placed under vacuum, the initial relative adjustments of the article with respect to the envelope can no more be ensured except for over-dimensioning the components of the assembly, which also raises the total manufacturing cost.

SUMMARY OF INVENTION

It is an object of the present invention to propose a process for adjusting the verticality which is particularly simple and reliable, representing reduced manufacturing cost by limiting the difficulties of assembling and not requiring narrow margins, and which is particularly suitable for the mounting in situ of assemblies which are pre-fabricated by the builder.

For this purpose, according to a feature of the invention, the process comprises the steps of associating with the article whose verticality is critical, a verticality indicator, placing the envelope containing the article on its base, controlling the inclination of the article by means of an indicator, adjusting the position of the envelope with respect to the base so that the indicator indicates a suitable vertical position of the article, and fixing the envelope to the base in the thus defined position. The control of the inclination by means of the verticality indicator is carried out visually or electrically.

According to another feature of the invention, an assembly comprising an article disposed inside a closed envelope intended to be mounted on a base by means of a support, is characterized in that it comprises a verticality indicator associated to the article, and means for adjusting the inclination of the envelope with respect to the base.

According to a specific characteristic of the invention, the verticality indicator comprises a heavy mass associated with a means for locating the angular position of the mass, the mass being typically suspended to a thread whose upper end is connected to the article, the locating means being a ring surrounding the mass.

According to a more specific aspect of the invention, the article is a distillation column and the verticality indicator is disposed inside a tube laterally mounted on the column, parallel with the main axis of the latter.

BRIEF DESCRIPTION OF DRAWINGS

Other characteristics and advantages of the present invention will appear from the description which follows of embodiments, given by way of illustration, but without limitation, with reference to the annexed drawings, in which.

DESCRIPTION OF PREFERRED EMBODIMENTS

Figure 1:
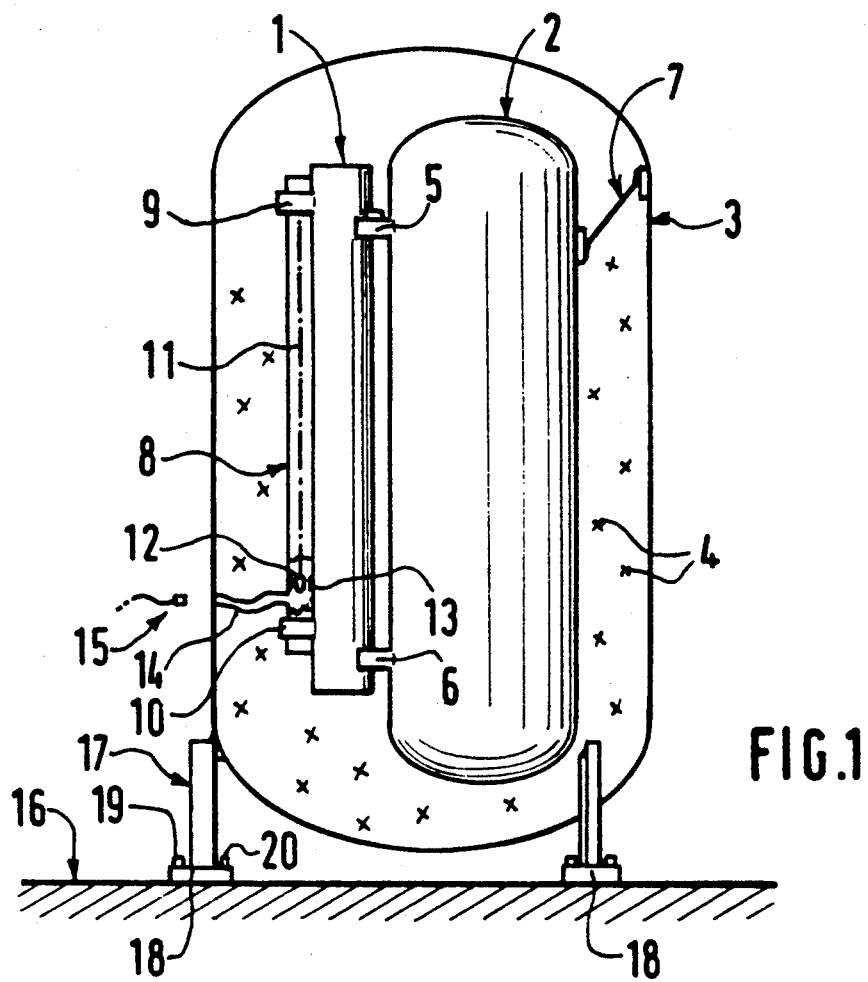
FIG. 1 is a schematic view in elevation of an assembly or cold box containing a column for the distillation of air and a storage container for liquified gas.
Figure 2:
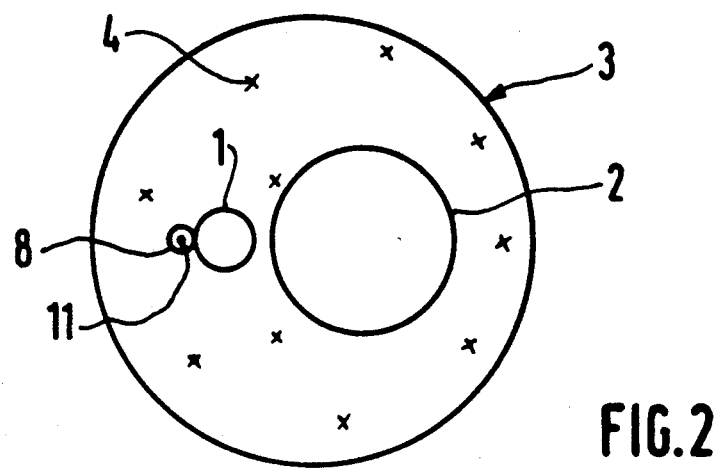
FIG. 2 is a schematic view in transverse cross-section of the assembly of FIG. 1.

In the description which follows and in the drawings, the same or analogous elements have the same reference numerals.

There is illustrated in FIG. 1 a cold box of an installation for the in situ production of gaseous nitrogen, of the type described for example in French patent application no. 90.04566 in the name of the applicant. This installation comprises for example a distillation column 1 of the type HPN (high purity nitrogen) and a storage container for liquid nitrogen 2 which, as well as other components, for example exchangers and a condenser, are disposed, to reduce the losses by heat input to a minimum, in a heat insulated envelope 3 filled with an insulating material 4, typically perlite or rock wool, and possibly under vacuum. It will be understood that in such an assembly, it is extremely difficult to effect operations for the mechanical adjustment inside the envelope, the assembly being pre-assembled at the builder and transported to the installation site. The dimensions of the assembly (which may reach 150 tons of load with an all around height of more than 15 meters, column 1 may be higher than the 8 meters) as well as margins of construction in boiler making and heavy mechanics do not enable to assure, during the installation in situ, a perfect verticality of the column. Now the latter, as well as all the devices which are based on a flow of fluid by gravitation, such as for example distillation tubes so called "Dickson rings", require, for a good operation and a perfect homogeneity of the distillation process, a strict verticality.

According to the invention, the distillation column 1 is advantageously supported by the storage container 2 by means of an upper semi-rigid connection 5 and a lower floating connection 6, the storage container 2 being itself suspended in the envelope 3 by means of a set of angularly distributed flexible blades 7. The storage container 2 and the column 1 are secured in the envelope 3 by means of the insulating material 4 which fills, for at least two thirds of its height, the envelope 3.

In a manufacturing plant, a tube 8 is mounted, by means of upper and lower flanges 9 and 10, along one side of the column 1 so that the axis of the tube 8 is rigidly parallel to the main axis of the column 1. A thread 11, typically metallic, is disposed inside the tube 8, the latter being connected at the upper end of the tube 8 and, at its lower end, to a heavy mass 12 located, in vertically installed position, in a locating ring 13 mounted in tube 8. Tube 8 is typically sealed at both ends and is filled with a gas which is substantially free of humidity and advantageously inert, for example nitrogen. To determine the relative position of the mass 12 with respect to the ring 13, a flexible duct 14, which is impervious and can be obturated, extends between the envelope 13 and the lower part of tube 8.

Figure 3:
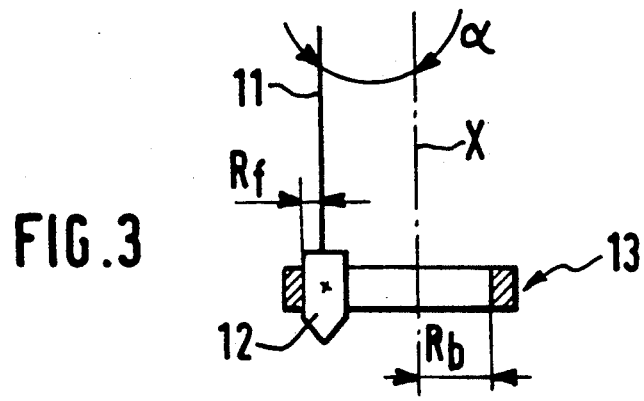
FIG. 3 is a schematic representation of the plumb line indicator.

As seen in FIG. 3, the length of thread 11 and the inner diameter of the ring 13 are determined so that the angle $\alpha$ between the thread and the axis X of the ring 13 and the tube 8, and which corresponds to the location where mass 12 is flush with inner cylindrical wall of the ring 13, is at most equal to an arc of one minute ($3 \times 10^{-4}$ Rn). By selecting a length for the thread 11 which is higher than 3.33 meters and a radius of mass $R_f$ which differs from the internal radius $R_b$ of the ring 13 by one millimeter, it will be possible to determine the verticality of the column 1 with a precision smaller than a minute of an arc. This adjustment of the verticality of the column 1 is carried out by controling the relative position of the mass 12 with respect to the ring 13 and with respect to its mounting base 16 which may consist of a simple concrete slab. The envelope 3 is generally mounted on base 16 by means of three supporting feet 17 comprising soles 18 anchored at the base 16 by means of bolts 19. By modifying the inclination of the soles 18 with respect to the base 16, for example by means of cables disposed between the sole 18 and the base 16 or screw jacks 20, the inclination of the envelope 3 is modified by consecutive approximations so that the mass 12 is finally substantially centered along axis X. Once this position has been obtained, the feet 17 are anchored on the base 16 by tightening bolts 19.

According to a first embodiment, in order to determine the relative position of the mass 12 with respect to ring 13, an endoscope 15 is introduced into the flexible duct 14, said endoscope being advantageously provided with a miniature video camera. Once the adjustment has been effected, the endoscope 15 is removed and the duct 14 is obturated.

Figure 4:
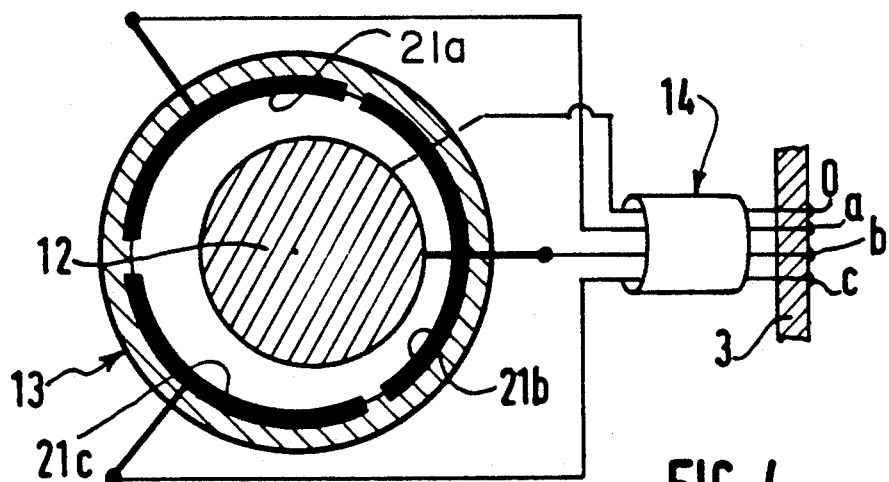
FIG. 4 is a schematic representation of a first embodiment of an electrical system for the indication of verticality.

In the embodiment of FIG. 4, the ring 13 comprises on its inner wall, three electrically conductive sectors 21a, 21b, 21c each covering an angle of about 120° and each centered on one of the support feet 17 and connected, by means of electrical lines extending in the duct 14, to contacts a, b, c, on the envelope 3. Mass 12, of electrically conductive material, is also connected, via a flexible thread, to a contact 0 on the envelope 3. The verticality will be obtained when the resistance between the mass 12 and each of the sectors 21 will be infinite.

Figure 5:
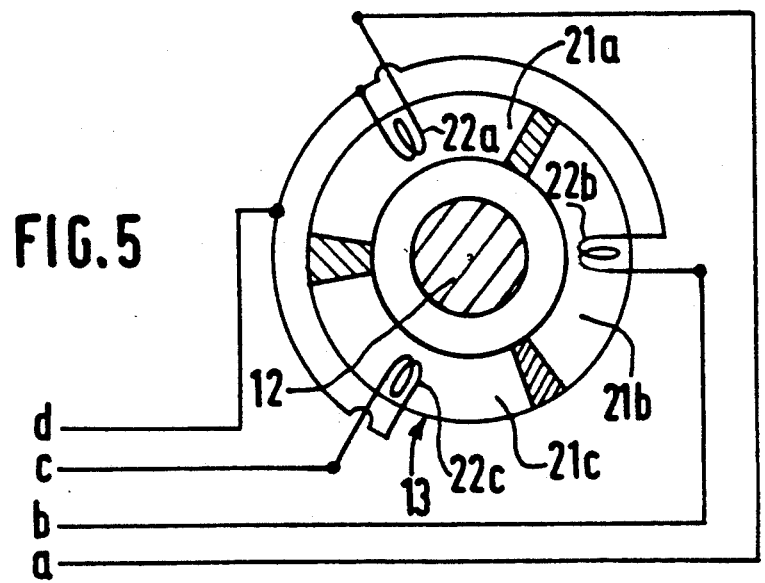
FIG. 5 is a schematic representation of a second embodiment of an electro-magnetic system for the indication of verticality.

In the embodiment of FIG. 5, the various sectors 21a, 21b, 21c are associated to coils 22a, 22b, 22c connected to contacts a, b, c, on the envelope 3 and fed by an electrical current originating from a source d. The mass 12 is of magnetic material and the adjustment of the verticality is obtained when the electromotive forces of the circuits of the various coils 22 are substantially identical.

Although the present invention has been described with respect to specific embodiments, it is not limited thereby but on the contrary, modifications and variants are possible as will appear to those skilled in the art.

We claim:

1. A method of adjusting the verticality of an operative device mounted in a surrounding closed envelope mounted on a base, comprising the following steps:
   connecting a verticality indicator to the device;
   mounting the device and connected indicator within the envelope;
   providing means for making position signals of the indicator available from outside the envelope;
   positioning the envelope on the base;
   adjusting the position of the envelope so that the position signals indicate a vertical position of the device;
   securing the envelope to the base in the thus-adjusted position of the envelope.

2. An assembly comprising an operative device mounted in a closed envelope to be mounted on a base by means of a support, a veticality indicator connected to the device in the envelope and having position sensing means coupled to position indication means outside the envelope, and adjustable support means for adjusting the inclination of the envelope relative to the base and for securing the envelope to the base in a selected position based on indications from said verticality indicator.

3. The assembly of claim 1, wherein the envelope is at least partially filled with a filling material into which the device is at least partially immersed.

4. The assembly of claim 3, wherein the device has a main longitudinal direction and the verticality indicator comprises a mass suspended to one end of a wire having an other end connected to the device, the mass and wire being received within a closed tubular member having a main axis and secured to the device with the main axis parallel to the longitudinal direction.

5. Assembly comprising an article having a main axis disposed in a closed envelope adapted to be mounted on a base by means of a support, an indicator of verticality associated with said article, said indicator of verticality comprising a heavy mass suspended to a thread in which the upper end is connected to the article, a ring surrounding the mass for locating the angular position of said mass with respect to vertical, said mass, thread and ring being disposed in a tube which is laterally mounted on said article parallel to said main axis, and means for adjusting the inclination of the envelope with respect to the base based on an indication from said verticality indicator.

6. Assembly according to claim 5, which comprises means for visual inspection of the position of the mass with respect to the ring.

7. Assembly according to claim 5, wherein the mass is of electromagnetic material and the ring comprises electromagnetic means responsive to the position of the mass with respect to the ring.

8. An air distillation assembly adapted to be mounted on a base by means of a support, comprising in a closed envelope a storage container of a cryogenic liquid, an air distillation column supported by the storage container, an indicator of verticality mounted on the air distillation column, and means for adjusting the inclination of the envelope with respect to the base based on an indication from said indicator of verticality.

9. Assembly according to claim 8, wherein the indicator of verticality comprises a heavy mass associated with means for locating the angular position of the mass with respect to vertical.

10. Assembly according to claim 8, wherein the envelope is at least partially filled with a heat insulating material.

* * * * *